Jan. 12, 1965 W. R. NEUBARTH 3,165,007
FEED MECHANISM
Filed July 11, 1962 2 Sheets-Sheet 1
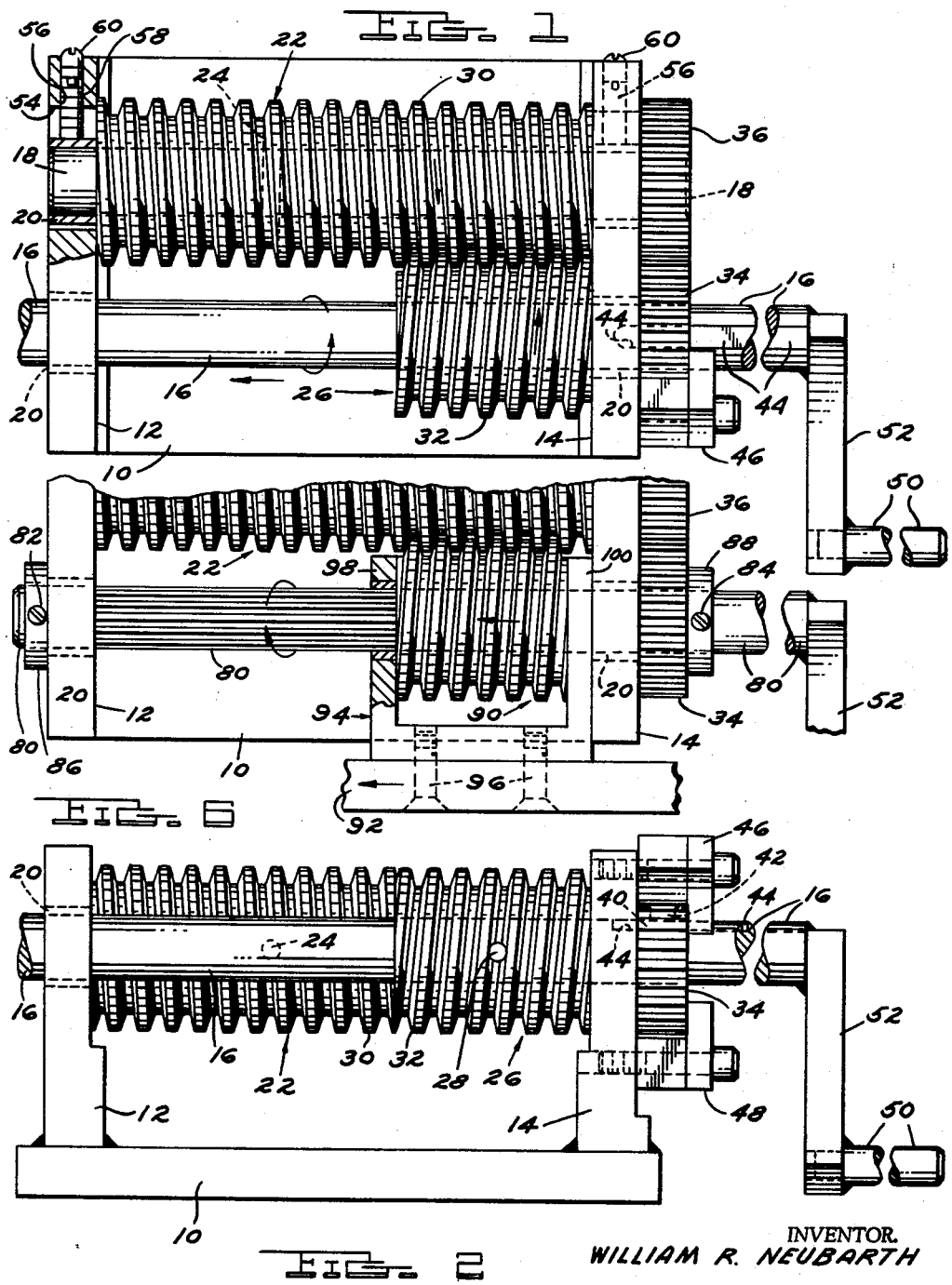
INVENTOR.
WILLIAM R. NEUBARTH
BY
Barnes, Kisselle, Raisch & Choate
ATTORNEYS

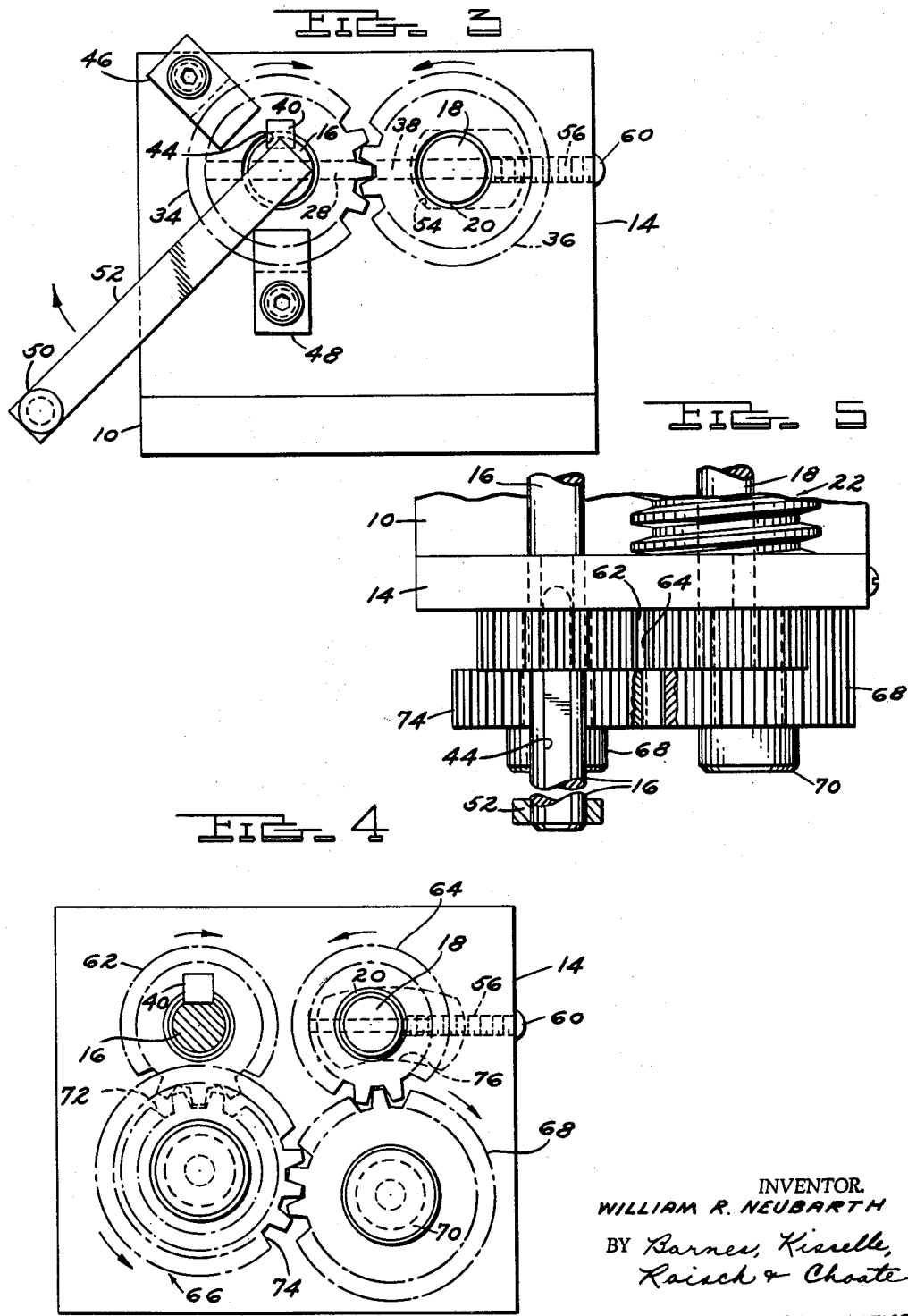

3,165,007
FEED MECHANISM
William R. Neubarth, 8411 Weil, Center Line, Mich., assignor of one-third to Elway P. Gray, Royal Oak, and one-third to Joseph B. Whitmore, Inkster, Mich.
Filed July 11, 1962, Ser. No. 209,209
10 Claims. (Cl. 74—424.8)

This invention relates to a mechanism for transmitting mechanical motion and more particularly to a feed mechanism for converting rotational motion to linear motion.

An object of the present invention is to provide a simplified, adjustable ratio gear mechanism capable of accurately converting rotational motion to linear motion.

Another object of the present invention is to provide a device useful for accurately imparting rectilinear motion between a workpiece and a machine tool in response to input power applied to the device by a rotating member.

A further object is to provide an improved lead screw mechanism which is economical and compact in construction and highly accurate and versatile in operation.

Other objects, features and advantages of the present invention will become apparent from the following description taken in conjunction with the accompanying drawings in which:

FIGS. 1 and 2 are plan and elevational views respectively of a lead screw mechanism constructed in accordance with the present invention with certain portions broken away and others shown fragmentarily.

FIG. 3 is an elevational view of the right end of the mechanism as viewed in FIG. 2.

FIG. 4 is an end elevational view of a modified form of the mechanism of the present invention.

FIG. 5 is a fragmentary plan view of the modified mechanism of FIG. 4.

FIG. 6 is a fragmentary plan view of a further modified form of the mechanism also in accordance with the invention.

Referring in more detail to FIGS. 1 and 2, the movable elements of the mechanism of the invention are shown supported in an operable assembly by a base 10 having a pair of spaced upright end plates 12 and 14 secured thereto. A lead or feed shaft 16 and an idler shaft 18 are journalled in suitable bushings 20 mounted in plates 12 and 14 so as to rotatably support shafts 16 and 18 in spaced parallel relation with one another. A straight type worm 22 is concentrically mounted on shaft 18 and is connected by a suitable pin 24 (FIG. 1) for rotation therewith. The opposite ends of worm 22 are adapted to bear against the respectively adjacent plates 12 and 14 so that the plates securely confine worm 22 and shaft 18 against axial movement. Shaft 16, however, has a free sliding fit in its bushings 20 to permit endwise movement of shaft 16 through the end plates. A shorter, straight-type worm 26 is mounted concentrically on shaft 16 and is affixed for rotational and axial movement therewith by a suitable pin 28 (FIG. 2). Worms 22 and 26 are formed with single threads 30 and 32 which are of opposite hand but of equal lead and equal pitch diameter, and shafts 16, 18 are positioned so that threads 30, 32 mesh in driving relation with their pitch cylinders tangential to one another.

As shown in FIG. 3 as well as FIGS. 1 and 2, worms 22 and 26 are rotated in opposite directions about their respective axes by a gear train comprising a pair of spur gears 34 and 36 mounted respectively on shafts 16 and 18 adjacent the outer side of plate 14. Gear 36 is secured to shaft 18 by a pin 38 (FIG. 3) while gear 34 has a sliding connection with shaft 16 comprising a key 40 mounted on an internal tongue 42 of gear 34 (FIG. 2) and slidably received in an axial keyway 44 of shaft 16. A pair of overhanging dogs 46 and 48, bolted to plate 14, retain gear 34 against axial movement away from the plate. Due to the key and slot connection, shaft 16 is free to slide through gear 34 while it rotatably drives the gear. This axial movement of shaft 16 is produced in response to axial force developed by the rotating engagement of worm 22 with worm 26, the extent of this axial travel of shaft 16 corresponding to the distance between plate 12 and the end of worm 26 adjacent thereto.

To operate the embodiment of the invention shown in FIGS. 1–3, a handle 50 of a crank 52 is turned so as to rotate shaft 16 in a clockwise direction as viewed in FIG. 3. Shaft 16 rotates gear 34 which in turn drives gear 36 so as to rotate shaft 18 in a counterclockwise direction. In the specific embodiment illustrated, gear 34 has 50 teeth while gear 36 has 49 teeth, and thus shaft 18 and worm 22 rotate at a slightly higher angular velocity than do shaft 16 and worm 26. This counterclockwise rotation of the right hand thread 30 of worm 22 tends to drive worm 26 and hence shaft 16 to the left as viewed in FIGS. 1 and 2. However, the clockwise rotation of the left hand thread 32 of worm 26 produces the opposite effect and hence tends to drive worm 26 and thus shaft 16 to the right. Due to the higher angular velocity of worm 22, the net result is a very slow rate or small increment of feed of lead shaft 16 to the left for a relatively high input r.p.m. or large angular movement applied to shaft 16. For example, with the 1 to 1.02 velocity ratio of gear 34 to gear 36, and with worm threads 30, 32 having a lead of .25 inch, shaft 16 will move a distance of .005 inch to the left for each complete clockwise revolution thereof. Conversely, one counterclockwise revolution of shaft 16 moves it .005 inch to the right. Thus the subtractive driving relation of the worms provides a velocity reduction of large magnitude as it converts angular rotation of shaft 16 to linear travel thereof.

A further feature is the movable mounting of bushings 20 on shaft 18 in each of the end plates 12 and 14. As seen in FIGS. 1 and 3, the mounting holes 54 have flat top and bottom sides spaced from one another by the O.D. of bushing 20, whereas the horizontally spaced curved sides of holes 54 are spaced from the O.D. of bushing 20 to permit lateral movement of shaft 18 and hence worm 22 relative to worm 26. Worm 22 is normally held positioned in meshing relation with worm 26 by a dog point screw 56 and a back-up locking screw 60 (FIGS. 1 and 3) which are threaded in radial holes 58 in end plates 12 and 14. With this arrangement, the worms are maintained in firm, intimate driving relation with one another, and the worms may be moved closer together as needed to take up the normal wear caused by their interengagement. Inasmuch as gears 34, 36 have the same pitch diameters as worms 22 and 26 and are carried by the same shafts, these spur gears also move towards one another during the wear take-up adjustment, but the normal clearance between these gears is usually well in excess of normal worm wear.

The movable mounting feature contributes to greatly reduced backlash in the drive mechanism a common problem of conventional lead screws. It also permits worm 22 to be moved laterally away from worm 26 until it is disengaged therefrom should it be desired to utilize shaft 16 solely as a power transmitting shaft rather than as a lead shaft. This is advantageous when the mechanism of the invention is incorporated in a machine tool such as an engine lathe wherein it is customary to provide a feed shaft in addition to a lead screw, the feed shaft being used for ordinary turning while the lead screw is reserved solely for thread cutting purposes in order to reduce wear and prolong the thread cutting accuracy of the machine tool.

As shown in the modified form of the invention of FIGS. 4 and 5, the ratio of angular input motion to resulting linear movement of the combined drive and feed shaft 16 may be adjusted by providing additional spur gears in the gear train adjacent plate 14. Spur gears 34 and 36 are replaced by smaller diameter, non-engaging spur gears 62 and 64 which are mounted on shafts 16 and 18 respectively in the manner of gears 34 and 36. The driving connection between gears 62 and 64 is provided by a compound gear 66, journalled on a shoulder screw 68 secured to plate 14, and by a double face idler gear 68, similarly journalled by a shoulder screw 70. Thus, rotation of shaft 16 rotates gear 62 which in turn drives the smaller gear 72 of compound gear 66 at a one to one ratio, causing the large gear 74 of compound gear 66 to drive, via idler 68, gear 64 and hence shaft 18 at a higher r.p.m. than shaft 16 as determined by the velocity ratio between the gears 74 and 64.

A modified mounting hole 76 is also provided in plate 14 (FIG. 4) for receiving bushing 20 of shaft 18 in a manner to permit bodily movement of worm 22 laterally towards worm 26. The upper and lower sides of mounting hole 76 are concentric with the pitch circle of gear 68 so that shaft 18 and hence gear 64 may be moved towards shaft 16 without affecting the distance between centers of the engaged gears 64, 68 of the drive train. However, the amount of movement of worms 22, 26 required for normal wear compensation is negligible and therefore the straight-sided hole 54 may be used without appreciably affecting the engagement of gears 64 and 68.

With either form of gear train, the reduction ratio of the lead screw mechanism may be adjusted without changing either of the two worms. As is apparent from the modified gear train arrangement, the lead mechanism of the invention is easily adapted for operation with machine tools having conventional gear change boxes, it being within the skill of the art in view of the present disclosure to operably connect such conventional gear trains to shafts 16, 18 to provide a selective range of ratios for imparting differential rotation to the worms 22, 26.

The modified form of the feed mechanism shown in FIG. 6 is similar to the mechanism of FIGS. 1–3 but instead of the feed shaft moving axially with worm 26, a splined shaft 80 is journalled by bushings 20 in end plates 12, 14 and fixed against axial movement relative thereto by suitable means such as set screws 82 and 84 threaded respectively in thrust washers 86 and 88 located respectively adjacent the outer sides of plate 12 and spur gear 34. A modified worm 90, identical to worm 26 except for the provision of internal male splines in the central bore thereof, is supported on shaft 80 and, due to the splined connection with shaft 80, rotates with shaft 80 but slides axially therealong in response to rotation of shaft 80. The axial movement of worm 90 is utilized in this embodiment to move a work support 92, and for this purpose a yoke 94 may be provided for interconnecting worm 90 and support 92. Yoke 94 is secured to support 92 by screws 96 and has a pair of arms 98 and 100 in which shaft 80 is journalled by bushings 102. Arms 98, 100 embrace worm 90 so as to fit closely against the opposite end bearing faces thereof. The operation of the modified mechanism of FIG. 6 is similar to that of the mechanism of FIGS. 1–3 except that shaft 80 does not move axially when it is rotated to impart linear motion to work support 92.

From the foregoing description it will now be apparent that the feed mechanism of the present invention provides a high translation ratio with a minimum of power transmission elements, thereby contributing to compactness and economy in manufacture. The simplicity of the mechanism also contributes to very high accuracy in operation since, with fewer parts, tolerance accumulation in the drive train is reduced and hence backlash is likewise reduced. The side-by-side engagement of the worms insures a large number of teeth in mesh for quiet, smooth transmission of large amounts of power with less wear per tooth. Since both worms normally rotate, the wear therebetween is distributed over the entire periphery of the worm threads. The subtractive driving relation of the side-by-side worms permits relatively large thread leads to be used, which is desirable from the standpoint of manufacturing costs, and yet a very accurate linear movement in extremely fine increments is obtainable from the device.

The subtractive driving relation of the worms also permits the use of spur or other conventional gears in the gear train with velocity ratios approaching 1:1, which in turn means a better mesh and less interference between the gears, thereby further reducing backlash. Since almost all of the velocity reduction is obtained by the interaction of worms 22 and 26, only the worms of the feed mechanism need be held to close tolerances whereas standard stock gears may be employed in the drive train since the usual backlash resulting therefrom is reflected only to a very small extent in the linear movement of shaft 16 or work support 92.

Although in the particular embodiments illustrated herein the drive train connects shaft 16 to shaft 18 so that forward and reverse operation is the same, it is to be understood that the drive train may be modified by incorporating a suitable clutch mechanism and associated gearing so that rotation of shaft 18 may be reversed from that previously described to provide a rapid return movement of worm 26 or 90 when it is desired to employ the feed mechanism of the invention in applications requiring an accurate, fine feed in one direction and a rapid return movement in the opposite direction.

The feed mechanism of the present invention lends itself to many applications requiring extreme accuracy, such as in measuring devices and gauges, but the invention is particularly useful when shaft 16 or worm 26 are suitably adapted for feeding a workpiece past a cutting tool or grinding wheel in thread cutting or grinding operations and the like. It is to be undersood that the device may be readily operated by power rather than manually as shown herein for the sake of clarity.

I claim:

1. In combination, first and second co-operatively threaded worms, means for rotatably supporting said worms in side-by-side relation with their respective axes parallel to one another and with their respective threads meshed in direct driving relation with one another to develop forces tending to move said worms in the direction of their axes in response to rotation of said worms in predetermined directions about their axes, said first worm being axially movable relative to said second worm such that said rotation results in predetermnied axial movement of said first worm relative to said second worm and said support means, and means for rotating said worms a predetermined angular distance correlated with the lead of their respective threads to produce a predetermined ratio of rotational movement to linear axial movement of said first worm.

2. The combination set forth in claim 1 wherein said means for causing rotation of said worms comprises a gear train including a first gear connected for co-axial rotation with said first worm and a second gear connected for co-axial rotation with said second worm, said gear train having a velocity ratio such that rotation of said first gear causes rotation of said first worm and, via said second gear, rotation of said second worm in said predetermined directions about their respective axes.

3. In a feed mechanism, the combination comprising a shaft, means for supporting said shaft for rotation about its axis and for movement in the direction of its axis, a worm connected to said shaft for co-axial rotation and axial movement therewith, a second worm supported for rotation about its axis and disposed with its axis parallel to said first worm axis, said worms having threads adapted to mesh in driving relation with one another to develop forces tending to move said worms axially in response to rotation of said worms in predetermined directions about their axes, means for positioning said second worm fixed against axial movement relative to said support means and in said driving relation with said first worm, and means for rotating said first shaft and said second worm such that said worms rotate at predetermined angular velocities correlated with the lead of the respective threads thereof to cause a predetermined axial movement of said shaft for each revolution thereof.

4. In combination, a pair of rigidly interconnected spaced supports, first and second shafts journalled in said supports with the shafts disposed in parallel spaced relation with one another, a worm concentrically secured to said first shaft for rotation therewith between said supports, said worm having bearing surfaces at the opposite ends thereof adapted to bear against said supports to maintain said worm in axially fixed position therebetween, a second worm concentrically supported on said second shaft for rotation therewith and for axial movement between said supports, said second worm being shorter in axial length than said first worm to permit movement of said second worm between said supports, said worms being co-operatively threaded with one another and maintained by said shafts in meshed driving relation with one another to develop forces tending to move said worms in the direction of their axes in response to rotation of said worms in predetermined directions about their axes, and means for causing said rotation of said worms at predetermined angular velocities correlated with the lead of the respective threads to produce a predetermined axial movement of said second shaft in response to a given angular movement thereof.

5. In combination, first and second co-operatively threaded worms, means for rotatably supporting said worms in side-by-side relation with their respective threads meshed in direct driving relation with one another to develop forces tending to move said worms in the direction of their axes of rotation in response to rotation of said worms in predetermined directions about their respective axes, said first worm being axially movable relative to said second worm such that said rotation results in predetermined axial movement of said first worm relative to said second worm and said support means, and means for rotating said worms a predetermined angular distance correlated with the lead of their respective threads to produce a predetermined ratio of rotational movement to linear axial movement of said first worm.

6. In combination, first and second co-operatively threaded worms, means for rotatably supporting said worms in side-by-side relation with their respective axes parallel to one another and with their respective threads meshed in direct driving relation with one another to develop forces tending to move said worms in the direction of their axes in response to rotation of said worms in predetermined directions about their axes, said first worm being axially movable relative to said second worm such that said rotation results in predetermined axial movement of said first worm relative to said second worm and said support means, means for rotating said worms a predetermined angular distance correlated with the lead of their respective threads to produce a predetermined ratio of rotational movement to linear axial movement of said first worm, said means for causing rotation of said worms comprising a gear train including a first gear connected for co-axial rotation with said first worm and a second gear connected for co-axial rotation with said second worm, said gear train having a velocity ratio such that rotation of said first gear causes rotation of said first worm and, via said second gear, rotation of said second worm in said predetermined directions about their respective axes, a shaft connected to said first worm for rotation and axial movement therewith about and along a common axis, said first gear being mounted on said shaft and having an axial sliding connection therewith, and means retaining said first gear in a fixed axial position relative to said second gear whereby said shaft may be rotated to cause axial movement thereof.

7. In combination, first and second co-operatively threaded worms, means for rotatably supporting said worms in side-by-side relation with their respective axes parallel to one another and with their respective threads meshed in direct driving relation with one another to develop forces tending to move said worms in the direction of their axes in response to rotation of said worms in predetermined directions about their axes, said first worm being axially movable relative to said second worm such that said rotation results in predetermined axial movement of said first worm relative to said second worm and said support means, and means for rotating said worms a predetermined angular distance correlated with the lead of their respective threads to produce a predetermined ratio of rotational movement to linear axial movement of said first worm, said means for causing rotation of said worms comprising a gear train including a first gear connected for co-axial rotation with said first worm and a second gear connected for co-axial rotation with said second worm, said gear train having a velocity ratio such that rotation of said first gear causes rotation of said first worm and, via said second gear, rotation of said second worm in said predetermined directions about their respective axes, said gear train including change speed gears operably connecting said first and second gears in driving relation.

8. In combination, first and second co-operatively threaded worms, means for rotatably supporting said worms in side-by-side relation with their respective axes parallel to one another and with their respective threads meshed in driving relation with one another to develop forces tending to move said worms in the direction of their axes in response to rotation of said worms in predetermined directions about their axes, said first worm being axially movable relative to said second worm such that said rotation results in predetermined axial movement of said first worm relative to said support means, means for rotating said worms a predetermined angular distance correlated with the lead of their respective threads to produce a predetermined ratio of rotational movement to linear axial movement of said first worm, said second worm being supported for bodily movement in a plane though the axes of said worms, and including means for moving said second worm in the direction of said bodily movement thereof and for maintaining said worms in said meshed relation with one another.

9. In combination, first and second co-operatively threaded worms, means for rotatably supporting said worms in side-by-side relation with their respective threads meshed in driving relation with one another to develop forces tending to move said worms in the direction of their axes of rotation in response to rotation of said worms in predetermined directions about their respective axes, said first worm being axially movable relative to said second worm such that said rotation results in predetermined axial movement of said first worm relative to said support means, means for rotating said worms a predetermined angular distance correlated with the lead of their respective threads to produce a predetermined ratio of rotational movement to linear axial movement of said first worm, said support means including a pair of fixed spaced supports and a splined shaft journalled for rotation about its axis in said supports and fixed against axial movement relative to said supports, said first worm being mounted on said shaft and having a sliding splined connection therewith so that said first worm is movable axially along said shaft in response to rotation therewith, said means for rotating said worms including drive means operably connected to said splined shaft to cause rotation thereof to produce said rotation of said first worm, and means operably connected for axial movement with said first worm for imparting said axial motion to a work support.

10. In combination, first and second co-operatively threaded worms formed with single threads which are of opposite hand relative to one another but of substantially equal lead and substantially equal pitch diameter, means for rotatably supporting said worms in side-by-side relation with their respective threads meshed in direct driving relation with one another to develop forces tending to move said worms in the direction of their axes of rotation in response to rotation of said worms in predetermined directions about their respective axes, said first worm being axially movable relative to said second worm such that said rotation results in predetermined axial movement of said first worm relative to said second worm and said support means, and means for rotating said worms a predetermined angular distance correlated with the lead of their respective threads to produce a predetermined ratio of rotational movement to linear axial movement of said first worm.

References Cited in the file of this patent
UNITED STATES PATENTS
2,907,224    Cafolla _____ Oct. 6, 1959

OTHER REFERENCES
German Printed Application 1,043,743, Nov. 13, 1958.